INVENTORS
RONALD L. STUCKEY
CHRISTIAN C. HOLST
BY John J. Gaydos
ATTORNEY

United States Patent Office 3,530,420
Patented Sept. 22, 1970

3,530,420
ELECTRICAL CONTROL WITH INSULATION SYSTEM AND TERMINAL REINFORCING MEANS
Ronald L. Stuckey, 462 E. Franklin, and Christian C. Holst, 403 W. Main St., both of Berne, Ind. 46711
Filed Apr. 29, 1968, Ser. No. 724,731
Int. Cl. H01c 5/02, 1/02
U.S. Cl. 338—174                            14 Claims

ABSTRACT OF THE DISCLOSURE

Housing of electrical control and terminals projecting from the housing are insulated by insulation system disposed around the housing. Terminals are disposed in and protected by a chambered portion of the insulation system that constrains the terminals against movement outwardly away from the housing. Forces applied to the terminals through external lead wires are distributed around the housing by the insulation system and bearing pads space the insulation system from the housing to permit the passage of convective air currents along the housing. Latches integral with the insulation system hold the insulation system and housing in assembled relation and panel fastening means may be formed integrally with the insulation system in order to permit the facile assembly of the control with a control mounting panel.

---

Figure 1:
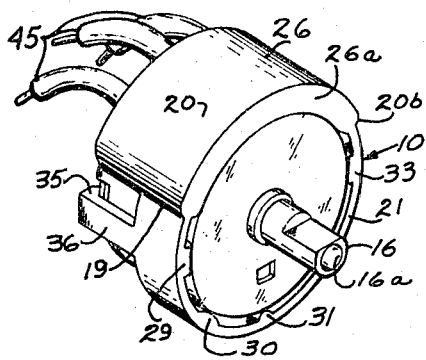

The present invention relates to electrical components and, more particularly, to an electrical control having a housing comprising termination means projecting therefrom, and an insulating system comprising a shroud that reinforces the termination means.

In some applications, it is desirable that the housing and termination means of a specific control be electrically insulated from each other and from at least portions of the physical environment in which the control is to be used. One approach taken heretofore has been to provide an electrical insulation system by manufacturing the control housing from an electrical insulative material. However, this approach has not been entirely satisfactory because the insulative materials used for this purpose have reduced the transfer of heat from the control and accordingly caused a reduction in the power rating of the control. In other applications, external lead wires soldered to the terminal of the controls are sometimes pulled or jerked with a force sufficienty large to peel the solder from the terminals. When these forces are applied to the terminals, undesirable deformation of the terminals can also result. One of the arrangements used to strengthen the terminals and prevent deformation thereof has included the use of relatively large masses of terminal material or complex terminal structural shapes. These arrangements have proved to be rather costly however and have not prevented the external leads from peeling the solder away from the terminals and have not provided a means for electrically insulating the terminals. Thus, it would be desirable to provide an improved control including an electrical insulation system that does not appreciably degrade the heat dissipation characteristics of the control, wherein the control terminals are reinforced against bending or other deformation thereof, wherein soldered connections between the terminals and external lead wires are protected from damage by tensile forces applied to the lead wires, and wherein the terminals are electrically insulated from each other and the housing of the control.

Accordingly, it is an object of the present invention to provide a new and improved electrical control having an insulation system and terminal reinforcing means wherein the heat dissipation characteristics and power rating of the control are substantially unaffected and wherein the terminals are reinforced without resorting to complex structural shapes and increased masses of terminal material. Another object of the present invention is to provide a new and improved electrical control wherein the terminals of the control are electrically insulated and also constrained against movement relative to the housing. An additional object of the present invention is to provide an electrical control wherein soldered connections between the control terminals and external lead wires are protected from damage when predetermined tensile forces are applied to the lead wires. A further object of the present invention is to provide an electrical control having an insulation system that promotes dissipation of heat from the control. Still another object of the present invention is to provide an electrical control having an insulating means easily assembled with a housing. Still an additional object of the present invention is to provide an improved control wherein the housing and terminals of the control are insulated from each other and wherein tensile forces applied to the terminals are distributed around the housing to increase the mechanical strength of the termination means. A still further object of the present invention is to provide an electrical control having a plurality of terminals insulated from each other and having means that adapt the control for mounting to a panel in a facile manner.

In accordance with one form of the invention, we have provided an electrical control of the variable resistance type having a housing with a plurality of terminals projecting therefrom and having insulating means that electrically insulate the housing and terminals. The insulating means preferably comprise a shroud disposed around the housing and having a chambered portion or first section comprising an inner wall or web disposed between the housing and the terminals and also comprising a terminal cover in the form of an outer wall overlying the terminals and constraining the terminals against movement outwardly away from the housing. A second section of the shroud in the form of a ligature member is connected to the ends of the chambered portion and holds the chambered portion in assembled relation with the housing. Latches integral with the ligature member snap over the rear wall of the housing to hold the shroud and housing in assembled relationship. Bearing pads carried by the ligature member distribute forces along the housing and space the ligature member from the housing to permit the passage of convective air currents along the housing. In one of the more specific aspects of the invention, any one of several forms of panel-fastening means formed integrally with the shroud permit the facile assembly of the control with a control-mounting panel.

Figure 3:
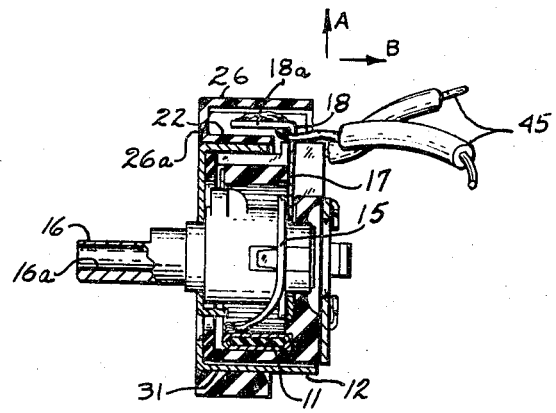
Figure 2:
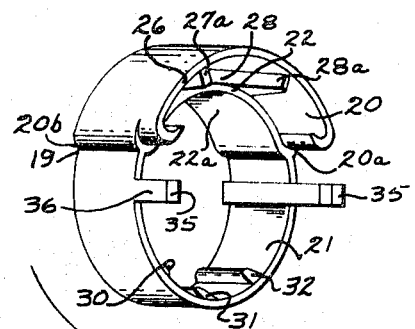
Figure 2:
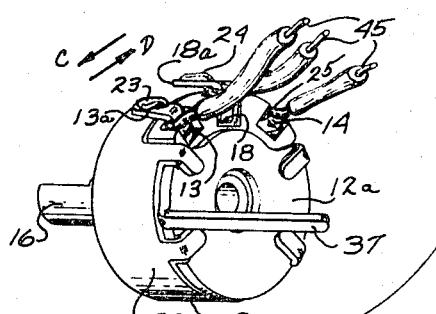
Figure 4:
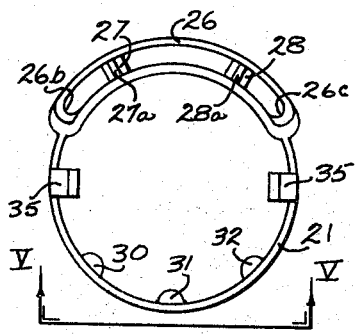
Figure 6:
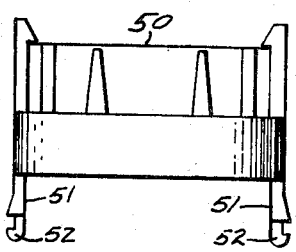
Figure 7:
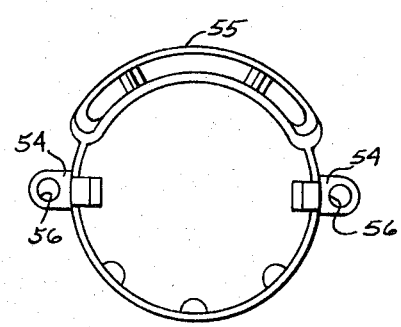
Figure 5:
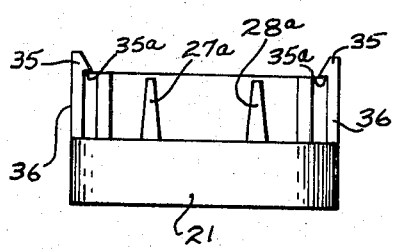

The subject matter which we regard as our invention is set forth in the appended claims. The invention itself, however, together with further objects and advantages thereof may be better understood by referring to the following description taken in connection with the accompanying drawings wherein the same reference numerals have been applied to like parts and wherein: FIG. 1 is an isometric view of an improved electrical component comprising a housing and an electrically nonconductive shroud assembled with the housing; FIG. 2 is an exploded view of the control of FIG. 1; FIG. 3 is a side elevation view of the control of FIG. 1 with parts in section and parts broken away; FIG. 4 is a rear view of the insulating portion of the component illustrated in FIG. 1; FIG. 5 is a view taken along the lines V—V of FIG. 4; FIG. 6 is a view similar to FIG. 5 of another embodiment of a shroud provided with panel-fastening means; and FIG. 7 is a rear view of yet another embodiment of a shroud provided with panel-fastening means that may be used in the practice of the invention.

Referring now more particularly to the drawings, a variable resistance type control embodying one form of the invention is generally identified by the reference numeral 10 and comprises a resistance element 11 supported in a metallic cup-shaped housing 12 with termination means including terminals 13 and 14 connected to each end of the resistance element 11. Also supported within the housing is a conductive contactor 15, constrained to rotate with a shaft 16, wipingly engaging the resistance element 11 intermediate the ends thereof and wipingly engaging a center collector 17 connected to a terminal 18. As best illustrated in FIG. 2, each of the terminals 13, 14, 18 have an end portion 13a, 14a, and 18a, respectively, extending outwardly along the housing 12.

In order to insulate the housing 12 and reinforce the terminals 13, 14, 18, an insulation system comprising insulating means and terminal reinforcing means is provided in the form of the shroud 19. Preferably, the shroud comprises a first section or chambered portion 20 and a second section or ligature member 21 connected to the ends 20a, 20b of the chambered portion 20. It will be appreciated from an inspection of FIGS. 2–4 that the chambered portion 20 includes a web or inner wall 22 lying between the terminals 13, 14, 18 and a wall 23 of the housing 12. In order to insulate and protect the solder connections 23–25 and end portions of the terminals as well as to reinforce the terminals in a manner hereinafter to be explained more fully, there is provided a terminal cover in the form of an outer wall 26 overlying the end portions of the terminals 13, 14, 18. In most applications, it is desirable to provide internal walls or spacers 27, 28 between the web 22 and outer wall 26 in order to reinforce the terminals and increase the structural rigidity of the chambered portion 20. As best shown in FIGS. 2 and 5, these spacers are provided with extensions 27a, 28a that provide an added measure of insulation between adjacent ones of the termianls 13, 14 and 18. The bearing pads 29–33 integrally formed with the ligature member 21 and the surface 22a of the chambered portion 20 cooperate to form a press fit with the wall 23 of the housing 12 when the housing and shroud assembly is secured by the coaction of latches 35 and the rear wall 12a of the housing. During assembly of the shroud and housing, the arms 36 carrying latches 35 flex outwardly relative to the housing and then snap the latch jaws 35a over the edge of the rear wall 12a as the front wall 26a of the chambered portion 20 approximately abuts the ends of the terminals 13, 14, 18.

The control 10 is particularly adapted for use with another not-shown control having an inner shaft that extends through the hollow bore 16a of the shaft 16 and also having a key slot or other alignment means that cooperates with the alignment key 37 carried by the control 10. During use of the control 10 electric current flows through the wound-wire resistance element 11 and an amount of heat is generated inside the housing in proportion to the square of the current flowing through the element 11 and the magnitude of the resistance of element 11. The control 10 may be made as illustrated or may be any other type or of any other configuration. One example of a suitable other configuration of a control that may be used in the practice of the present invention is the control shown and described in the commonly assigned co-pending Bender et al. application Ser. No. 533,878 filed on Mar. 14, 1966, the disclosure of which is specifically incorporated herein by reference. When a control embodying the present invention is connected between the output of an audio amplifier and two or more loudspeakers to operate as a fader control, it may be necessary to dissipate relatively large amounts of energy in the control. This dissipated energy is, as will be understood, in the form of heat which in turn must be dissipated from the control. In practice, heat generated in the resistance element 11 of the control 10 will be transferred to the metal wall 34 of the housing 12 without appreciable difficulty. However, since the shroud 19 is formed from a semiresilient electrical insulating matreial such as a glass-filled thermo-plastic, the shroud establishes a thermal barrier or thermal insulation system around the control 10 that could limit the heat dissipation characteristics and power rating of the control. One aspect of the present invention takes cognizance of this fact and solves the heat dissipation problem by providing a plurality of passageways between the bearing pads 29–33, housing wall 34 and shroud 19 to permit the flow of convective air currents along the housing and thus improve the heat dissipation characteristics of the control 10. Therefore, it will be understood that the present invention provides an improved control having an electrical insulation system that does not comprise the heat dissipation characteristics or power rating of the control. It will also be understood that the present invention provides a new and improved control with an insulation system that can be assembled with a control housing in a simple and facile manner.

Of equal, and perhaps even greater importance, is the reinforced structural rigidity of the terminals 13, 14, 18 and connections thereto that results from the use of the shroud 19. In many different applications, and particularly in automotive applications, the external lead wires 45 may be subjected to substantial tensive forces from time to time. The external lead wires 45 are often formed as a three conductor single sable terminating in a single plug or socket. We have observed that, in practice, the lead wires are gripped intermediate this plug and the control and then indelicately pulled or "jerked" to disconnect the plug from a socket or other plug. With disconcerting frequency, this application of tensive forces to the lead wires has literally destroyed the terminals of prior art controls and/or broken the connection between such terminals and the lead wires associated therewith.

In order to ascertain the magnitude of the advantageous results obtainable with the present invention, controls identical to the illustrated control 10 were tightly held and a tensive force of twenty-five pounds was applied to the three lead wires of each of the controls in each of the directions indicated by the arrows A, B, C, and D in FIGS. 2 and 3. After repeated applications of the twenty-five pound tensive force to the lead wires of each one of several individual controls (all identical to control 10), there were no observable undesirable effects on the controls, terminals, or connections between the terminals and lead wires. However, when the insulation system was removed from the sample controls, it was not possible to exert on the lead wires a tensive force in excess of fifteen pounds without deforming the terminals and destroying the connection between the terminals and lead wires connected thereto. In the second group of tests, when a tensive force of only about twelve pounds was exerted on the lead wires in the direction represented by the arrow A in FIG. 3, the end portions of the terminals moved outwardly away from the control housing whereupon the lead wires would either break at their point of connection to the terminals or peel the solder away from the terminals. When the lead wires of controls without a shroud were subjected to a force of from twelve to fifteen pounds in a direction indicated by the arrow B, the same unsatisfactory results were observed, i.e., the end portions of the terminals would move outwardly away from the housing followed by a breaking of the lead wire and/or a peeling of the soldered connection away from the terminals. These unsatisfactory results were also observable when a force of from twelve to fifteen pounds was applied to the lead wires in either of the directions indicated by the arrows C and D. The unexpected and advantageous results obtained by assembling the shroud 19 with the control 10 are believed to be caused by the chambered portion 20 of the shroud and the operation of the outer wall 26 as a reinforcement means for the terminals. Thus, when tensive forces are applied to the external lead wires in the direction of arrows A or B, the terminal cover or outer wall 26 constrains the end portions 13a, 14a and 18a of the terminals from movement outwardly away from the housing 12 and forces that may be exerted against the outer wall 26 by the end portions of the terminals are apparently transmitted to the ligature member which, through the bearing pads 29–33, distributes such forces around the wall 34 of the housing 12. On the other hand, tensive forces applied in the direction of arrows C and D apparently tend to urge the end portions of the terminals against the spacers 27, 28 and one of the ends 26b, 26c of the outer wall 26. In this situation, the forces are also evidently distributed around the housing by the ligature member through the beairng pads 29–33 and latches 35. Thus the shroud, in addition to providing an insulation system for the control 10 without substantially affecting the heat dissipation characteristics or power rating of the control, provides a means for reinforcing terminals extending along the housing.

In some applications, it may be desirable to mount a control embodying the present invention directly to a panel by using a modified shroud of the type illustrated in either FIG. 6 or FIG. 7. In FIG. 6, the shroud 50 is provided with a pair of plug-in fasteners each having a leg 51 adapted to be fixed radially of the axis of the shaft of the control when being mounted on a not-shown panel. Uncinate members 52 formed on the end of each of the legs 51 are adapted to cooperate with fastener-receiving apertures formed in the above-mentioned control mounting panel and hold the control in assembled relationship with the panel.

In the emboidment of FIG. 7, a panel-fastening means are illustrated as a pair of ears 54 integrally formed on the shroud 55 and extend radially outwardly therefrom. The apertures 56 formed in the ears 54 may then be used in cooperation with any suitable fastening means carried by or cooperable with a control-mounting panel.

Although there has been illustrated and described a control of the variable resistance type embodying the invention, it will be expressly understood that other types of controls may embody the invention and could have been chosen for purposes of illustration. In addition, it will be understood that the control housing may be other than cylindrical in shape and that various inventive aspects of the present disclosure may be used without others, e.g., terminal reinforcing means according to the invention may be employed without regard to the heat dissipation characteristics of the control. While there has been illustrated and described what is at present considered to be a preferred embodiment of the present invention and various modifications thereof, it will be appreciated that numerous changes and modifications are likely to occur to those skilled in the art, and it is intended in the appended claims to cover all those changes and modifications which fall within the true spirit and scope of the present invention.

What we claim as new and desire to secure by Letters Patent of the United States is:

1. A variable resistance control comprising a housing, a driver rotatably supported in the housing, a resistance element, a collector, a conductive contactor constrained to rotate with the driver for wipingly engaging the resistance element and the collector, a first terminal connected to one end of the resistance element and having an end portion thereof extending outwardly from and along the housing, a second terminal connected to the other end of the resistance element and having an end portion thereof extending outwardly from and along the housing, a third terminal connected to the collector and having an end portion thereof extending outwardly from and along the housing, and means disposed around the terminals for electrically insulating the terminals and for constraining the end portions of the terminals against movement relative to the housing whereby the structural rigidity of the terminals is increased, said means comprising an insulative shroud detachably secured to the housing and including a terminal cover extending across the end portions of the terminals thereby to limit movement of the end portions of the terminals away from the housing.

2. The control of claim 1 wherein the shroud has a chambered portion with a web disposed between the housing and the end portions of the terminals to thereby insulate the terminals from the housing.

3. The control of claim 1 wherein said means further comprises a ligature member integrally connected to the terminal cover and extending around the housing, the shroud includes a web disposed between the end portions of the terminals and the housing thereby to electrically insulate the terminals from the housing and further includes spacers integral with the web extending between adjacent terminals whereby adjacent terminals are insulated from each other, and the ligature member includes bearing pads engaging the periphery of the housing and spacing the ligature member from the housing thereby to provide a passageway for convective air currents and to increase the dissipation of heat from the control.

4. A variable resistance control comprising a housing, an insulative shroud having contiguous first and second sections disposed around the housing, and a plurality of terminals supported by the housing, said terminals having end portions extending outwardly from the housing, the first section of the shroud having first and second ends, the second section of the shroud extending around the housing between the ends of the first section, the first section of the shroud comprising an outer wall overlying the terminals for constraining said end portions against movement relative to the housing.

5. The control of claim 4 wherein a plurality of bearing pads integral with the shroud space the shroud from the housing and form passageways for convective air currents, the passageways promoting improved heat dissipation from the control.

6. The control of claim 5 wherein the housing is substantially cylindrical and the bearing pads provide means for distributing a compressive force against the housing when the terminals are urged outwardly from the housing and against the outer wall of the shroud.

7. The control of claim 4 wherein the terminals extend along the housing in a first direction and the shroud includes a pair of arms extending in a direction opposite to said first direction, each of said arms having latches gripping the housing in assembled relationship.

8. The control of claim 4 wherein panel-mounting means are formed integrally with the shroud and extend away from the housing to provide means for fastening the control to a panel.

9. The control of claim 8 wherein the panel-mounting means comprise laterally projecting ears having fastener receiving apertures therein for securing the control to a panel.

10. The control of claim 8 wherein the panel-mounting means comprise uncinate members for cooperating with apertures formed in a control supporting panel.

11. An electrical control comprising a housing with at least two termination means projecting from the housing, each of the termination means having an end portion spaced from and extending along the housing, and an insulative shroud comprising a chambered portion with end portions of the termination means disposed therein and further comprising a ligature member integral with the chambered portion and extending around the housing, said chambered portion having an inner wall disposed between the end portions of the termination means and the housing thereby to insulate the end portions of the termination means from the housing, said chambered portion also having an outer wall overlying the end portions of the termination means thereby to restrain movement of the end portions of the termination means relative to the housing.

12. The control of claim 11 wherein the ligature member includes a plurality of bearing pads firmly engaging the housing, the chambered portion includes a front wall abutting against the end portions of the termination means and contiguous with the inner and outer walls, and the shroud further includes latch means bearing against the housing and holding the shroud and housing in assembled relation, the bearing pads distributing forces around the housing when the end portions of the termination means are urged against said outer wall.

13. The control of claim 12 wherein the housing and shroud are substantially cylindrical, the bearing pads form a press fit with the housing, and the shroud further comprises panel fastening means.

14. The control of claim 12 wherein the chambered portion of the shroud further comprises at least one internal wall extending from the inner wall to the outer wall and disposed between the end portions of adjacent termination means thereby to insulate the termination means from each other.

References Cited

UNITED STATES PATENTS

| | | |
|---|---|---|
| 2,798,139 | 7/1957 | Dickinson et al. __ 338—184 XR |
| 3,210,457 | 10/1965 | Hancock et al. _____ 174—48 |

FOREIGN PATENTS

| | | |
|---|---|---|
| 863,633 | 3/1961 | Great Britain. |
| 872,071 | 7/1961 | Great Britain. |
| 1,072,347 | 6/1967 | Great Britain. |

THOMAS J. KOZMA, Primary Examiner

U.S. Cl. X.R.

174—138; 338—184, 197, 199